United States Patent
Olsson et al.

[11] Patent Number: 5,156,008
[45] Date of Patent: Oct. 20, 1992

[54] METHOD AND ARRANGEMENT FOR FREEZING

[75] Inventors: Lennart Olsson; Lars Eek, both of Nyhamnsläge, Sweden

[73] Assignee: Frigoscandia Food Process Systems AB, Helsingborg, Sweden

[21] Appl. No.: 720,528

[22] PCT Filed: Dec. 22, 1989

[86] PCT No.: PCT/SE90/00745
  § 371 Date: Jun. 21, 1991
  § 102(e) Date: Jun. 21, 1991

[87] PCT Pub. No.: WO90/06693
  PCT Pub. Date: Jun. 28, 1990

[30] Foreign Application Priority Data
  Dec. 22, 1988 [SE] Sweden ............. 88043636-2

[51] Int. Cl.$^5$ ............................ F25D 13/06
[52] U.S. Cl. ......................... 62/63; 62/378; 62/380
[58] Field of Search .......... 62/63, 378, 380, 50.2

[56] References Cited

U.S. PATENT DOCUMENTS

| | | | |
|---|---|---|---|
| 3,611,745 | 10/1971 | Schlemmer | 62/380 |
| 3,791,162 | 2/1974 | Baker | 62/341 |
| 4,205,536 | 6/1980 | Kasahara | 62/380 |

FOREIGN PATENT DOCUMENTS 87025939  6/1987  Sweden.
1441846  12/1973  United Kingdom.

Primary Examiner—Ronald C. Capossela
Attorney, Agent, or Firm—Browdy and Neimark

[57] ABSTRACT

In a method for freezing the surface of one of a food product, the product is placed on a supporting structure (1). This has previously been given such a low temperature that the product when contacting the supporting structure will not freeze on to it. The product is maintained on the supporting structure for a sufficient time to cause at least its surface layer nearest the supporting structure to pass into the frozen state. An arrangement for carrying out the method comprises, in addition to the supporting structure, also means for imparting to it the low temperature, such as means (2–4) for supplying a cooling agent to the underside of the supporting structure.

20 Claims, 1 Drawing Sheet

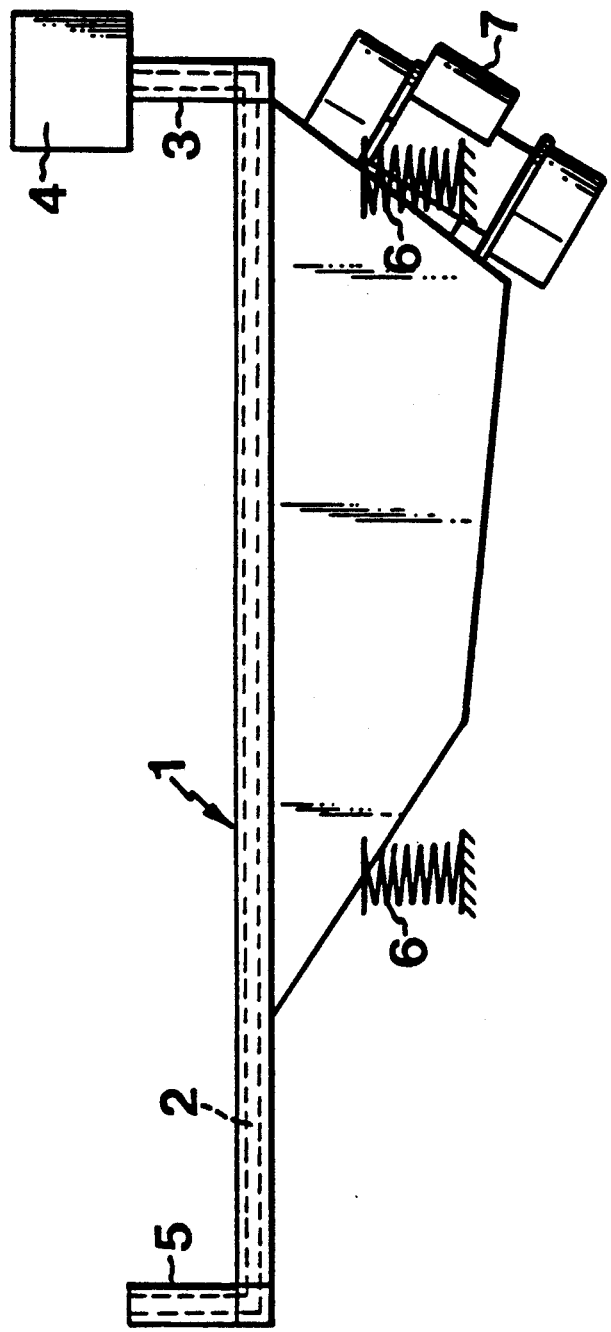

METHOD AND ARRANGEMENT FOR FREEZING

The present invention relates to a method and an arrangement for freezing a food product.

For freezing food products, use is often made of freezing equipment in which the product is carried by some type of supporting structure during freezing. Once the freezing is completed, the product should be removed from the supporting structure, which in many cases involves substantial difficulties.

When using e.g. a freezing tunnel with a belt conveyor where the conveyor belt, in the form of a flat conveyor belt, feeds the product through the long freezing tunnel, the product will freeze onto the conveyor belt. It must then be scraped off or broken loose from the supporting structure, leaving remnants of the product frozen fast on the supporting structure. This freezing technique also requires considerable space, and the process cannot be modified or discontinued until the entire product has been transformed into solid ice phase.

When using e.g. a freezer with a foraminated conveyor belt, the product may also freeze on to the belt or receive impressions or be deformed by the belt.

Although it is previously known in the art, by different types of surface treatment, to try to prevent a product from freezing fast on e.g. a steel belt, these attempts have met with but little success.

The difficulties mentioned above, which are especially pronounced for products having soft consistency or a soft or moist surface, can however be overcome by stabilising at least one surface of the product before final freezing, whereby to obtain improved handleability of the product.

The object of the invention is to provide a method and an arrangement bringing about such stabilization in an uncomplicated fashion by freezing at least one surface of the product, without, of course, any risk of the product freezing fast on the belt.

According to the invention, this object is achieved by placing the product on a supporting structure which has previously been given such a low temperature that the product when contacting the supporting structure will not freeze to it, maintaining the product on the supporting structure for a sufficient time to cause at least its surface layer nearest the supporting structure to pass into the frozen state, and removing the product from the supporting structure for final freezing in a separate freezer.

The invention relies on the presumably newly discovered phenomenom that there is no tendency whatever of the product freezing to the conveyor belt when the temperature of the supporting structure becomes sufficiently low. The temperature at which this phenomenom appears depends on the nature of the product and thus varies with the composition of the product to be frozen. Hence, for each product there is a critical temperature below which this phenomenom can be brought about. The value by which the temperature should fall below the critical temperature in actual practice is dependent on the properties of the material of the supporting structure on which freezing should be performed, and on how the temperature decrease of the supporting structure is achieved.

It is thus likely that an increase of the water content of the product above a certain value entails a decrease of the critical temperature. The same probably also applies to a more liquid consistency of the product.

The properties of the material of the supporting structure which are most likely to affect the practical temperature required for avoiding that the product freezes fast on the conveyor belt are the thermal conductivity of the material and its heat capacity. This can probably be explained by the heat transfer process occurring during the time period counting from the moment the product to be subjected to surface-freezing is placed on the supporting structure to the moment the portion of the product surface facing the supporting structure and making direct contact with the supporting structure when placed thereon has passed into the frozen state. During this time period, the temperature in the boundary between the product and the supporting structure should not exceed the critical temperature.

Thus, the temperature of the product itself immediately before it is placed on the supporting structure will of course also affect to some extent the temperature of the supporting structure required for preventing the product from freezing on to the supporting structure.

The object of the invention is also achieved by means of a device for carrying out the method according to the invention as defined above, which is characterised by a firm supporting structure on which the product is intended to be placed, means for giving the supporting structure such a low temperature that the product when contacting the supporting structure will not freeze to it, and a separate final freezer to which the product is intended to be fed for final freezing as soon as its surface layer nearest the supporting structure has passed into the frozen state.

The cooling agent used may be e.g. a cryogenic gas or a secondarily cooled eutectic solution (cooling brine), or a directly-expanding refrigerating compressor technique can be used.

The invention provides a technique for conveniently stabilizing the surface of the product making contact with the supporting structure and, hence, the entire product, which thus becomes easier to handle and undergoes no deformation. Further, no product remnants will be left on the supporting structure, which means that no special measures for cleaning the supporting structure need be taken. The product will then also maintain its initial weight. It can easily be passed on to another freezer, for instance one with a foraminated belt, and be finally frozen therein without any risk of the product freezing fast, or of product waste, impressions or deformation.

The invention will be described in more detail hereinbelow with reference to the accompanying drawing whose only FIGURE schematically shows an embodiment of an arrangement according to the invention.

The drawing shows from the side an arrangement for freezing the surface of one side of food products, such as shaped ice figures, hamburgers, fish fillets, pieces of chicken, cut fruit and sauce portions. The arrangement has a supporting structure in the form of a plate 1, for instance of stainless steel. The plate 1 has through channels 2 which are connected at one end to a common inlet 3 communicating with a source 4 of a cooling agent, such as cryogenic gas in the form of liquid nitrogen. At the other end, the channels 2 are connected to an outlet 5.

The plate 1 is resiliently mounted by means of springs 6 and connected to a vibrator 7. This can cause the plate 1 to vibrate with such an amplitude and in such a direction that products placed on the plate 1 will be moved along the plate 1 in a predetermined direction. Thus, it is also possible to determine the residence time of the products on the plate 1.

When using the arrangement shown in the drawing for freezing the surface of products, the plate 1 is first given a sufficiently low temperature by passing cryogenic gas through the channels 2 from the source 4 and the inlet 3 to the outlet 5. With the vibrator 7 in operation, the products can thereafter be placed on the upper side of the plate 1. As a result of the low temperature, the products will be frozen in their surface layer nearest the plate 1 without freezing onto it. At the same time the vibrator 7 causes the products to move along the plate at such a speed that the desired surface-freezing has been achieved when the products reach the side edge of the plate 1 located in the direction of movement of the products.

From the plate 1, the products can be passed on to a conventional freezer (not shown) of optional type for final freezing of the products. In this case, the arrangement according to the invention serves as a separate prefreezer. However, it can also be integrated with the final freezer and thus form part thereof.

For the conveyance of the products along the plate 1, it is possible, as an alternative, to use a belt in the form of a film or a cloth which thus runs in direct contact with the plate 1 and supports the products. In this case, the belt is part of the supporting structure. The conveyance can also be provided for in any other suitable way.

Alternatively, the supporting structure need not be vibrated, but may be movable, with the provision of a stationary scraper for removing the products from the supporting structure. A stationary supporting structure in combination with movable scrapers is also conceivable.

In the embodiment now described, the supporting structure may be completely smooth, but may also have a pattern of grooves or depressions. The shape of the supporting structure may generally be conformed to the shape required for each particular product.

Further, the supporting structure should consist of a material having good thermal conductivity and good heat capacity, but it may also be made up of several materials arranged in superposed layers. The topmost layer should then have a particularly good thermal conductivity.

One example of a suitable material for the supporting structure is, as mentioned above, stainless steel, but also other materials, such as aluminum, are conceivable. In the case of stainless steel, it has been found necessary in practical test in order to prevent the product from freezing on to the supporting structure, to use a temperature of about −90° C., whereas in the case of aluminium the corresponding temperature can be about −60° C. A variety of other materials and combinations of materials are however possible.

According to a preferred aspect of the invention, the product is maintained on the supporting structure for a sufficient time to cause a product surface layer having a thickness of less than about 5 mm, preferably less than about 1 mm, to pass into the frozen state. This time is normally less than about 30 s, preferably less than about 20 s.

Thus, the invention is not restricted to the embodiment described above, but may be modified by anyone person skilled in the art within the scope defined by the accompanying claims. Although the invention is especially well suited for the surface-freezing of food products intended for individual freezing, whether these products are solid, semi-solid, pasty, semi-liquid or liquid, it is also usable for freezing the surface layer of products which are spread out, irrespective also in this case of the consistency of the products, continuously or batchwise. In the case of a semi-liquid or liquid product, the supporting structure suitably has depressions for receiving the product. In this manner, the product will be provided with a frozen crust enclosing the non-frozen portion of the product. The supporting structure may also be supplemented with cover elements which, together with the supporting structure, form closed cavities for the product. These cover elements should then be given the same temperature as the supporting structure. In both of these latter cases, it is possible to use some type of ejector means for removing the product from the associated depression.

We claim:

1. A method for stabilizing a food product by partial freezing thereof, comprising cooling a firm supporting structure to a sufficiently low temperature so that a food product, when placed in contact with said supporting structure, will not freeze to it, said temperature being below −60° C.;

placing the food product on said firm supporting structure which has been cooled to a temperature below −60° C. and maintaining the food product on the supporting structure for a short time sufficient to cause a surface layer of said food product nearest the supporting structure to pass into the frozen state, said short time being less than about 30 seconds; and removing the product from the supporting structure for final freezing in a separate freezer.

2. A method according to claim 1, wherein said cooling of said firm supporting structure is carried out by applying a cooling agent to an under-surface of said firm supporting structure.

3. A method according to claim 2, wherein said cooling agent is liquid nitrogen.

4. A method according to claim 1, wherein said time sufficient to cause the surface layer nearest the supporting structure to pass into the frozen state constitutes a sufficient time to cause freezing of said surface layer to a thickness of less than about 5 mm.

5. A method according to claim 1, wherein said time sufficient to cause the surface layer nearest the supporting structure to pass into the frozen state constitutes a sufficient time to cause freezing of said surface layer to a thickness of less than about 1 mm.

6. A method according to claim 1, wherein said time sufficient to cause the surface layer nearest the supporting structure to pass into the frozen state is less than about 20 seconds.

7. A method in accordance with claim 1, wherein said temperature is below about −90° C.

8. A method according to claim 1, further comprising moving the food product along the supporting structure during said freezing.

9. A method in accordance with claim 1, comprising moving said supporting structure during said freezing.

10. A method according to claim 9, wherein said moving of said supporting structure comprises vibrating said supporting structure.

11. A method for freezing a food product in two stages, comprising cooling a firm supporting structure on which to effect partial freezing and stabilization of the food product by rapidly cooling to a sufficiently low temperature so that the food product, when contacting said supporting structure, will not freeze to it, said temperature being below −60° C., said cooling comprising applying a cooling agent to an under-surface of said supporting structure;

placing the food product on said firm supporting structure which has been cooled to a temperature below −60° C. and maintaining the food product on the supporting structure for a time sufficient to effect only partial freezing thereof by causing a surface layer of said food product nearest the supporting structure to pass into the frozen state, said time being less than about 30 seconds;

moving said supporting structure during said partial freezing;

passing the partly frozen product from the supporting structure to a second freezer; and completing freezing of the food product in the second freezer at a temperature higher than −60° C.

12. Apparatus for stabilizing a food product by partial freezing thereof, comprising a firm supporting structure on which to effect freezing of the food product;

cooling means for cooling said firm supporting structure to a temperature of less than −60° C. and sufficiently low so that the food product, when contacting said supporting structure, will not freeze to it;

conveying means for moving the food product on said firm supporting structure which has been cooled to a temperature below −60° C. and keeping the food product on the supporting structure for a time sufficient to cause a surface layer of said food product nearest the supporting structure to pass into the frozen state, said time being less than about 30 seconds; and means for removing the product from the supporting structure for final freezing in a separate freezer.

13. An apparatus according to claim 12, wherein said cooling means comprises means for applying a cooling agent to an under-surface of said firm supporting structure.

14. An apparatus according to claim 13, wherein said under-surface comprises an upper surface of at least one channel underneath said supporting structure.

15. An apparatus according to claim 12, wherein said conveying means comprises means for moving the food product along said supporting structure during said freezing from one end thereof to another end thereof.

16. An apparatus according to claim 12, wherein said conveying means comprises means for moving said supporting structure.

17. An apparatus according to claim 16, wherein said means for moving said supporting structure comprises vibrator means for vibrating said supporting structure.

18. Apparatus according to claim 16, wherein said supporting structure comprises a movable surface layer in the form of a film or cloth.

19. An apparatus according to claim 12, wherein said supporting structure has depressions for receiving the food product.

20. Apparatus according to claim 19, further comprising cover elements provided over said depressions to form closed cavities for the food product, and means for cooling said cover elements to the same temperature as the supporting structure.

* * * * *